US006862386B2

(12) United States Patent
Corio et al.

(10) Patent No.: US 6,862,386 B2
(45) Date of Patent: Mar. 1, 2005

(54) METHOD OF MAKING A MACH-ZEHNDER INTERFEROMETER, AND RELATED DEVICE

(75) Inventors: Valeria Corio, Milan (IT); Aurelio Pianciola, Casteggio (IT)

(73) Assignee: Corning Incorporated, Corning, NY (US)

( * ) Notice: Subject to any disclaimer, the term of this patent is extended or adjusted under 35 U.S.C. 154(b) by 490 days.

(21) Appl. No.: 10/113,447

(22) Filed: Mar. 28, 2002

(65) Prior Publication Data

US 2002/0157422 A1 Oct. 31, 2002

Related U.S. Application Data

(60) Provisional application No. 60/281,801, filed on Apr. 6, 2001.

(30) Foreign Application Priority Data

Mar. 30, 2001 (EP) .............................. 01108125

(51) Int. Cl.⁷ ................................................. G02B 6/26
(52) U.S. Cl. .......................................... 385/43; 385/51
(58) Field of Search .......................................... 385/43

(56) References Cited

U.S. PATENT DOCUMENTS

| 5,119,453 A | * | 6/1992 | Gonthier et al. ............... 385/43 |
| 5,710,848 A | * | 1/1998 | Dumais et al. ................ 385/43 |
| 5,915,050 A | * | 6/1999 | Russell et al. ................. 385/7 |
| 5,943,458 A | | 8/1999 | Miller .......................... 385/39 |
| 6,185,345 B1 | * | 2/2001 | Singh et al. ................... 385/24 |

FOREIGN PATENT DOCUMENTS

| GB | 2163549 A | 2/1986 |
| GB | 2191013 A | 12/1987 |
| JP | 11023887 | 1/1999 |
| WO | WO 98/29769 | 7/1998 |

* cited by examiner

*Primary Examiner*—John D. Lee
*Assistant Examiner*—James Stein
(74) *Attorney, Agent, or Firm*—Juliana Agon

(57) ABSTRACT

A method of making an all-fiber Mach-Zehnder interferometer comprising at least two optical fibers comprises the steps of bringing the fibers in a reciprocal contact relationship for a contact section thereof; fusing together and tapering the fibers in at least a first portion of said contact section; forming at least two optical couplers between the fibers in a second and a third portions of said contact section, located at opposite sides of said first portion.

20 Claims, 3 Drawing Sheets

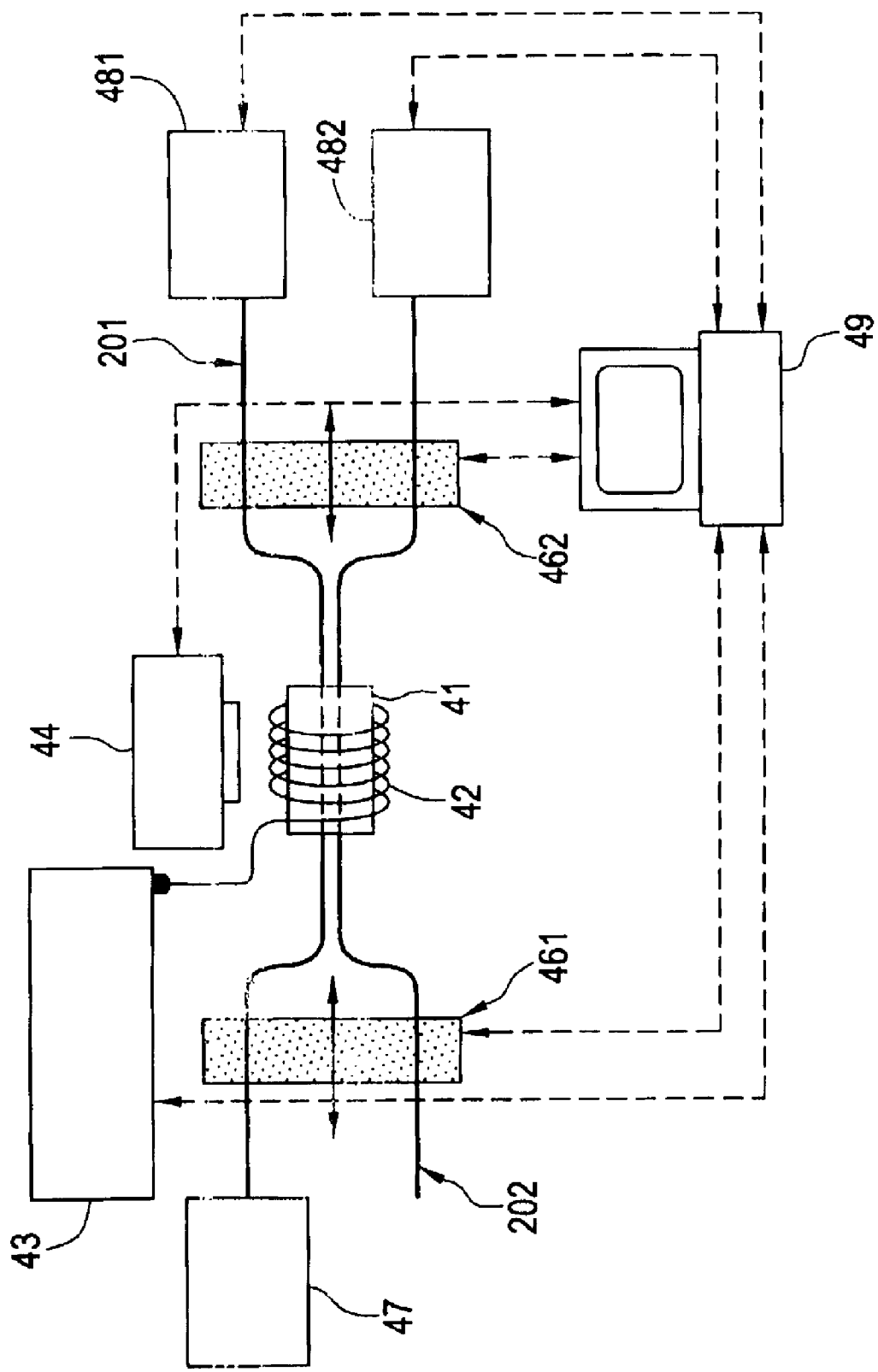

METHOD OF MAKING A MACH-ZEHNDER INTERFEROMETER, AND RELATED DEVICE

CLAIM OF PRIORITY

This application claims the priority benefit of European Application number 01108125.4 filed Mar. 30, 2001 and U.S. Provisional No. 60/281,801 filed Apr. 6, 2001.

SUMMARY OF THE INVENTION

The present invention concerns a method of making a Mach-Zehnder interferometer, particularly in all-fiber technology, and a related Mach-Zehnder interferometer.

In principle, a Mach-Zehnder Interferometer (shortly, MZI) is a device having at least one optical input, two interferometer arms, at least one optical output and two optical couplings, capable of working as optical power splitters, one between the at least one input and the interferometer arms, the other between the interferometer arms and the at least one output.

Typical MZIs have two inputs and two outputs ("2×2 MZI"), albeit simpler MZIs can have only one input and one output.

A 2×2 MZI using single-mode optical guides comprises a first pair of optical guides and a second pair of optical guides. The optical guides can be optical fibers or integrated guides. The device is bi-directional or reciprocal: the first pair of optical guides and the second pair of optical guides can be used alternately as inputs, respectively outputs, or as outputs, respectively inputs, the device operation being nominally identical in the two cases.

The first pair of optical guides and the second pair of optical guides are coupled to respective optical couplings, acting as optical power splitters. The two optical couplings are coupled to each other by means of two optical guide segments, forming the interferometer arms.

Each of the interferometer arms has an optical length equal to $\beta L$, where $\beta$ is the propagation constant of the propagating mode and L is the physical length of the arm. The propagation constant $\beta$ is in turn equal to $(2\pi/\lambda)*n$, where $\lambda$ is the wavelength of the propagating mode and n is the refraction index of the propagating mode. The two arms can have equal or different optical lengths: in the former case the interferometer is said to be balanced, while in the latter it is said to be unbalanced.

Typically, each optical power splitter splits in two nominally equal parts the optical power received on either one of the two inputs thereof. More generally, the optical splitting ratios of the two optical power splitters can be different from 50%, and also be different from each other.

By properly designing the optical power splitting ratios of the two optical power splitters and the degree of unbalance of the interferometer arms, it is at least nominally possible to obtain on the device outputs, by interferometric effect, any optical power splitting ratio from 0% to 100% of the optical power supplied to the device through any one of the two inputs, independently of the operating optical band of the optical power splitters.

In particular, for optical power splitters having a 50% splitting ratio (also referred to as 3 dB optical power splitters) on a nominally infinite optical band (in practice, on the whole band of the single-mode optical guides), a balanced MZI is capable of transferring on one of the two outputs thereof the whole optical power received trough one of the two inputs thereof, on a nominally infinite optical band. In the same condition, an unbalanced MZI in which the difference between the arm optical lengths is equal to $\pi$ at a predetermined wavelength is capable of transferring the whole optical power from one input to one output thereof only at said predetermined wavelength.

In a MZI having only one input and one output, the unbalance between the two arms only determines an output attenuation of optical power.

MZIs are devices widely used in many applications in optics, thanks to the structural simplicity thereof and because they are formed by elements that can easily be practically implemented in optical guides, such as integrated wave guides or optical fibers, exploiting a single technology.

MZIs are particularly attractive in several applications, both in the field of telecommunication and in the field of sensors. In fact, MZIs allow for example to vary the optical power splitting ratio on their outputs in dependence of a difference in optical length of the two interferometer arms. A difference in optical length between the two arms can be deliberately induced, for example by means of a suitable control, to obtain a variable attenuator or an optical switch. Otherwise, this effect can be exploited to detect or measure characteristic properties of materials or structures which, once inserted in one of the two interferometer arms, can induce variations in the optical length thereof.

MZIs can be practically fabricated by means of two main technologies.

A first technology makes use of planar technology applied to substrate materials such as lithium niobate, semiconductor materials, silica glass, with integrated planar optical guides.

MZIs fabricated by this technology are however difficult to interface with most of the existing transmission lines.

A second technology, also referred to as all-fiber technology, allows fabricating MZIs directly from two optical fibers, properly coupled to each other to form the optical power splitters.

This second technology is particularly interesting in applications requiring low optical losses. Moreover, techniques are known providing for acting directly on the fibers which permit to vary the optical length of the arms quite efficiently. By way of example, structures including Bragg gratings are more conveniently implemented in all-fiber MZIs than in planar technology MZIs, because of the lower losses and also because the techniques of formation of Bragg gratings in fibers are more mature than those currently available for planar guides.

A conventional technique for fabricating all-fiber MZIs generally provides for bringing two fibers close to each other for a sufficiently long section thereof, from which the external plastic coating has previously been removed; forming the first optical coupling by fusing together the fiber claddings and stretching the fibers in a first region of said section; forming the second optical coupling by fusing together the fiber claddings and stretching the fibers in a second region of said section, properly spaced apart from the first region. The most common technique for forming the optical couplers is known as Fused Biconical Tapering ("FBT").

In the device thus obtained, the two fibers remain physically independent from each other in the region between the two optical couplings, that is, in the region of the two interferometer arms. In such a region the fibers can be for example individually coated with a thin layer of high resistivity material to form a device tuneable by thermo-optic effect, such as the electrically tuneable MZI described in GB-A-2191013, or a piezo-electric squeezer can be mounted on one of the two fibers to induce, by piezo-electric deformation of the fiber, a differential phase shift between radiations of different polarization, such as the switchable polarisation splitter described in GB-A-2211956.

These techniques allow to have a significant flexibility in controlling the spectral response of the MZI. For example, in F. Bilodeau et al., "An all-fiber dense-wavelength division multiplexer/demultiplexer using photoimprinted Bragg gratings", Photon. Techn. Lett., vol. 7, pp. 388–390, 1995, and in U.S. Pat. No. 4,900,119 balanced MZIs obtained by fused fibers with Bragg gratings in the two interferometers arms are described. EP-A-0989423 describes a way to optimize the spectral response of a fused fiber MZI with Bragg gratings in the interferometer arms and optical couplings formed as asymmetric fused couplers, by properly modifying the fibers in the regions of the optical couplings.

U.S. Pat No. 5,479,546 describes an all-fiber MZI with two tapered biconical couplers, in which one of the arms has a tapered optical fiber region. The MZI is thus rendered unbalanced and the spectral response thereof can be controlled.

U.S. Pat. No. 6,031,948 describes an all-fiber MZI. The MZI is properly unbalanced so to have a spectral response suitable for separating DWDM channels when cascading several MZIs.

In T. Birks et al., "Integrated Fibre Optics", Report Un. Di Bath GR/L63747, 2000, a fiber fusing technique is described by means of which all-fiber MZIs can be obtained. According to this technique, the diameter of the two fibers is preliminarily reduced, and the optical power splitters are realized by means of very short (less than a millimeter) optical couplers.

WO 98/29769 describes that using all-fiber MZI made of special fibers it is possible to obtain non-linear switches responsive to an optical command.

The Applicant has observed that MZIs fabricated by means of the known implementation of the all-fiber technology, for example those described in the references cited above, are in general affected by the problem that the devices thus obtained are not structurally monolithic. The two fibers constituting the MZI are in fact fused together only in the regions of the two optical power splitters, while in the region of the interferometer arms the two fibers remain physically distinct. The device operating point strongly depends on the differential optical length of the interferometer arms, and such a differential optical length in turn strongly depends on thermal gradients, vibrations and other environmental stresses on the fibers. Being the two fibers physically distinct from each other, the differential optical length of the interferometer arms is thus heavily affected by thermal gradients, vibrations and other environmental stresses that impact to a different extent on the two fibers. In other words, in the region of the interferometer arms where the two fibers are physically distinct, optical path gradients may arise on one of the two fibers more than on the other fiber, due to undesired effects such as environmental stresses (temperature gradients, for example), vibrations etc. These optical path gradients make the device operating point not stable: the structure is thus extremely critical from the stability viewpoint.

The stability problem is exacerbated when Bragg gratings are formed in both the interferometer arms: in this case the above criticality adds up to the already critical stability of the Bragg gratings.

Due to this, it is practically very difficult to find out an efficient solution to the problem of packaging the device.

In U.S. Pat. No. 5,295,205 and in WO 97/39368 an all-fiber MZI fabrication technique is described providing for preliminary inserting the fibers in an external tube, for example made of glass. The tube is then evacuated and heated to make it collapse onto the fibers. The tube is further heated and stretched at two spaced locations to form two optical couplers.

The Applicant has observed that the adoption of the external tube partly solves the stability problem mentioned above, but the complexity of the fabrication process is significantly increased.

GB 2178846 discloses a MZI comprising a single optical fiber incorporating two coaxially disposed waveguides, e.g. an inner rod waveguide and a surrounding tube waveguide, and having a pair of axially spaced tapered regions forming couplers between the two waveguides at said regions. A MZI is then obtained by submitting the structure to two successive tapering operations.

The Applicant has observed that this technique intrinsically overcomes the stability problem mentioned above, but the guide structure employed is neither optically nor physically compatible with the optical fibers commonly used in optical systems, and this makes the resulting device difficult to be used.

In GB 2163549 a MZI fabrication technique is described, in which starting from two optic fibers, two optical couplers are formed by a fused biconical tapering technique, with the two optic fibers crossing over at a very small angle so that intermediate fiber sections constituting the interferometer arms are closely adjacent each other. These sections are then barely fused together to form a joint. The joint has a figure-of-eight cross-section, so there is very little interference at the intermediate fiber sections between optical signal components propagating along the fibers. However the joint is sufficient to secure the fibers against vibration. Alternatively, the intermediate fiber sections constituting the interferometer arms are rigidly supported by some other means.

The Applicant has observed that in this way the stability problem mentioned above is at least partially overcome, and a pseudo-monolithic structure is obtained having an increased vibrational stability compared to structures in which the fiber sections forming the interferometer arms are totally physically independent from each other.

However, the step of barely fusing together the portions of the two fibers forming the interferometer arms is carried out only after the optical couplers have been formed. The Applicant has observed that this requires an extremely critical control of this process step, not to induce undesired, substantially irreversible mismatches in the optical path of the interferometer arms.

In EP-A-0204492 a MZI fabrication process is reported in which, starting from a pair of fibers, a first and a second optical couplers are formed by fiber heating and stretching the fibers. Then, both arms of the interferometer are coated with a thin layer of high resistive material, electrodes connected to the ends of the layer on one arms, and the device is encapsulated in a protective medium comprising a thermosetting resin.

The Applicant has observed that by encapsulating the device in the thermosetting resin protective medium thermal and mechanical stability is conferred thereto. However, the use of resins in the region of the interferometer arms may induce irreversible undesired mismatches in the arm optical length, due to the shrinkage of the fibers during the curing of the resin.

The Applicant has also observed that MZIs fabricated by the known techniques, such as those described in the references cited so far, are affected by the problem that the interaction efficiency of an external control signal with the interferometer arms is quite limited. This is a consequence of the fact that in the region of the interferometer arms the initial optical structure of the two fibers is, at the best, substantially unaltered. As known, optical fibers are fabricated in such a way as to confine the oscillation mode substantially at the centre of the fiber, and have a cladding more than ten times thicker than the mode dimension. This makes very difficult to affect from outside the optical signal propagating through the fiber. The Applicant has observed that, contrary to this, it would be highly desirable to have MZIs with an efficient interaction between the optical signal propagating through the fibers in the region of the interferometer arms and external control signals or particular structures, to modify the relative phase of the optical signal in the two interferometer arms. In this way the differential optical path of the interferometer arms could be efficiently modified so as to change the optical power distribution at the interferometer outputs, and tuneable structures and optical switches can be obtained.

Referring to U.S. Pat. No. 5,295,205 and WO 97/39368, the Applicant has observed that the presence of the external tube renders the interaction with the optical signal even less efficient than without external tube.

In GB 2178846, the Applicant has observed that due to the coaxial arrangement of the two waveguides, it is difficult to have access to the inner waveguide and consequently the efficiency of interaction with an external control signal is quite low.

As far as GB 2163549 is concerned, the Applicant has observed that by barely fusing together the fiber sections constituting the interferometer arms, the two fibers remain substantially physically distinct from one another, the extent of co-penetration of the two fibers being substantially negligible. The efficiency of the interaction of an external control signal with the interferometer arms thus remains quite limited.

Concerning EP-A-0204492, the Applicant has observed that encapsulating the device in thermosetting resin protective medium exacerbates the problem of a low efficiency of interaction with an external control signal.

The Applicant has devised a fabrication method that allows for obtaining substantially monolithic all-fiber MZIs, in which before the steps of forming the optical splitters/couplers, the optical fibers are fused together in the portion thereof which in the final device will form the interferometer arms. Additionally, in said portion the fibers are tapered to provide a prescribed degree of optical coupling between the fibers in the region of the interferometer arms: this is for example achieved by monitoring the degree of optical coupling between the fibers during the fusing and tapering step, and terminating it when the prescribed degree of optical coupling is reached.

A first aspect of the invention relates to a method of making an all-fiber Mach-Zehnder interferometer comprising at least two optical fibers. The method is characterized by comprising the steps of:
 bringing the fibers in a reciprocal contact relationship for a contact section thereof;
 fusing together and tapering the fibers in at least a first portion of the contact section;
 forming at least two optical couplers between the fibers in a second and a third portions of the contact section, located at opposite sides of the first portion.

Preferably, said first portion is located mid way between the second and third portions.

In particular, the first portion of the contact region may substantially extend from the second portion to the third portion.

Preferably, the fusing together and tapering the fibers precedes the forming at least two optical couplers.

In particular, the fusing together and tapering the fibers comprises stretching the fibers in the first portion of the contact section.

Preferably, the fusing and tapering the first and second fibers comprises softening without stretching the fibers in the first portion of the contact section, and then simultaneously fusing together and stretching the fibers.

In particular, said softening the fibers comprises heating the fibers in the first portion of the contact section up to a first prescribed temperature, and said simultaneously fusing together and stretching the fibers comprises heating the fibers in the first portion of the contact section up to a second prescribed temperature, higher than the first prescribed temperature.

Preferably, the first prescribed temperature is approximately equal to 1470° C., and the second prescribed temperature is approximately equal to 1580° C.

Advantageously, the fusing together and tapering the fibers in the first portion of the contact section comprises monitoring a degree of optical coupling between the fibers and terminating the tapering when a monitored degree of optical coupling reaches a prescribed value.

Preferably, the prescribed value of the monitored optical coupling is not higher than approximately $3/1000$, preferably $1/1000$.

Advantageously, said monitoring the degree of optical coupling comprises injecting into one of the fibers an optical signal at a monitoring wavelength higher than an operating wavelength of the Mach-Zehnder interferometer, and monitoring a coupled optical power at said wavelength.

For example, the monitoring wavelength is approximately equal to 1550 nm and the operating wavelength is approximately equal to 1310 nm.

Preferably, the optical couplers are formed by means of a fused biconical tapering technique.

The method may further comprise securing the fibers to a support in two securing locations, substantially at two ends of said contact section.

A second aspect of the invention relates to an all-fiber Mach-Zehnder interferometer comprising at least two optical fibers in reciprocal contact relationship in a contact section thereof and at least two optical couplers respectively formed in a first and second portions of said contact section, characterized in that the fibers are fused together and tapered in at least a third portion, intermediate the first and second portions of the contact section.

Preferably, said third portion is located mid way between the second and third portion of the contact section.

The third portion of the contact section may substantially extend from the first second portion to the second third portion of the contact section.

Advantageously, the fibers are secured to a support in two securing locations, substantially at two ends of said contact section.

A third aspect of the invention relates to an optical device characterised in that it comprises:
 a Mach-Zehnder interferometer as above described
 a control element associated to said third intermediate portion adapted to vary the phase of an optical signal that is propagating in said Mach-Zehnder interferometer.

Preferably, said control element is a thermo-optical actuator.

More preferably, said thermo-optical actuator is a resistive material film applied externally to the fiber.

According to an alternative embodiment, said control element is a piezoelectric actuator.

Further features and advantages of the invention will be made apparent by the following detailed description of a possible practical embodiment thereof, provided merely by way of example and made in connection with the attached drawings, wherein:

FIG. 4 is a schematic diagram, partially in terms of functional blocks, of an apparatus suitable for performing the method of the invention;

Figure 1:
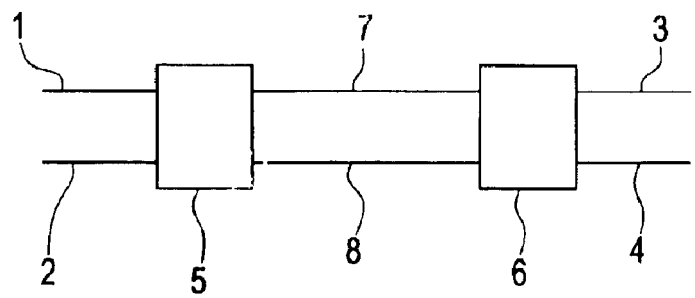
FIG. 1 is a schematic diagram of a Mach-Zehnder Interferometer (MZI)

With reference to the drawings, and particularly to FIG. 1, a schematic diagram of a Mach-Zehnder Interferometer (MZI) is shown. The MZI comprises a first pair of optical guides 1, 2 and a second pair of optical guides 3, 4. The first pair of optical guides 1, 2 and the second pair of optical guides are optically coupled to a first optical coupler 5 and a second optical coupler 6, respectively. Between the first 5 and the second 6 optical couplers, two optical guide sections 7, 8 form respective arms of the interferometer.

The device is substantially bi-directional (i.e., reciprocal): the first pair of optical guides 1, 2 and the second pair of optical guides 3, 4 can alternately act as interferometer inputs, respectively outputs, or vice versa. In the practice however the device can be optimised for working in one direction only, for example with the first pair of optical guides 1, 2 working as inputs and the second pair of optical guides 3, 4 working as outputs.

The schematic diagram of FIG. 1 is descriptive of a MZI independently of the technology adopted for the fabrication thereof.

Figure 2:
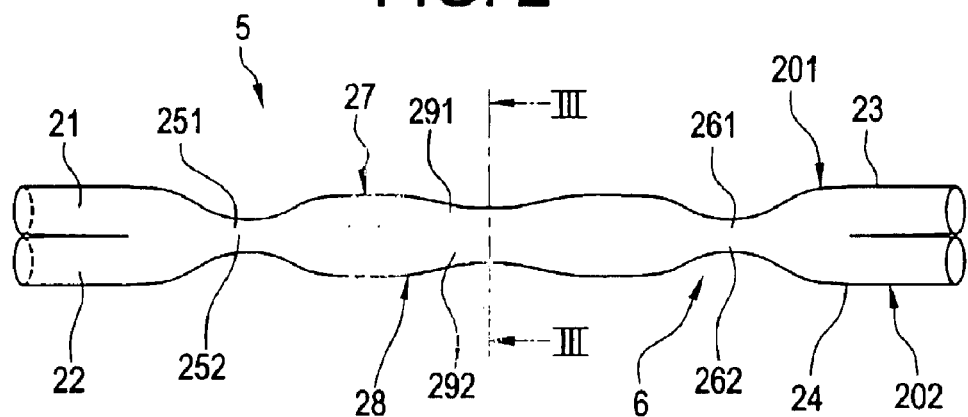
FIG. 2 is a schematic elevation view of a MZI fabricated according to the method of the invention.

FIG. 2 schematically shows in elevation an all-fiber MZI according to an embodiment of the invention. The device comprises a first fiber 201 and a second fiber 202, aligned and close to each other in a reciprocal contact relationship.

First sections 21, 22 of the first and second fibers 201, 202 forms the first pair of optical guides 1, 2. Second sections 23, 24 of the first and second fibers 201, 202 form the second pair of optical guides 3, 4. The first and second optical couplers 5, 6 are formed by respective first and second fused together and tapered sections 251, 252 and 261, 262 of the first and second fibers 201, 202.

Intermediate sections 27, 28 of the first and second fibers 201, 202, respectively, extending between the first and second fused and tapered sections 251, 252 and 261, 262 correspond to the optical guide sections 7, 8 of FIG. 1 and form the interferometer arms. The first and second fibers 201, 202 are fused together and tapered at least in respective portions 291, 292 of the intermediate sections 27, 28. The fiber portions 291, 292 extend across a plane III—III transversal to the fibers 201, 202. Preferably, but not limitatively, plane III—III is placed substantially mid way along the intermediate fiber sections 27, 28. Still more preferably, but still not limitatively, the third sections 291, 292 are centered around plane III—III.

Figure 3:
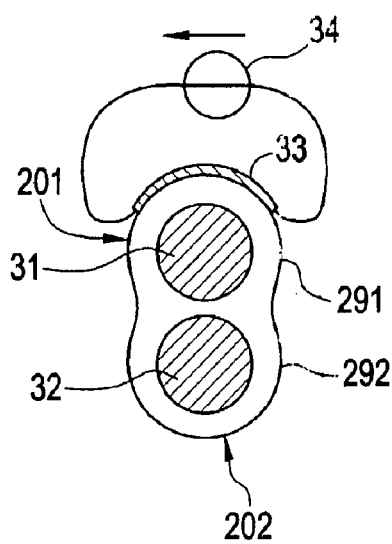
FIG. 3 is a cross-sectional view along line III—III in FIG. 2.
Figure 3A:
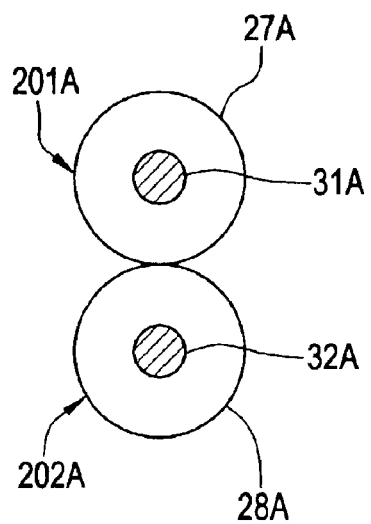
FIG. 3A is a cross-sectional view similar to that of FIG. 3, of a conventional device.

FIG. 3 shows a cross-sectional view along plane III—III of the MZI of FIG. 2. Shaded circular regions 31, 32 schematically show the distribution of the optical power associated with a propagating mode inside the interferometer arms. By comparison, FIG. 3A shows a similar cross-sectional view of a conventional all-fiber MZI comprised of two fibers 201A, 202A and wherein, in the respective fiber sections 27A, 28A forming the interferometer arms, the fibers 201A, 202A are in simple contact relationship; as in FIG. 3, shaded circular regions 31A, 32A show the optical power distribution of the propagating mode. It can be seen that the width of the optical power distribution 31, 32 of the propagating mode compared to the external dimension of the fibers is substantially higher in the MZI of FIG. 2 than in the conventional MZI. This widening is a consequence of the guiding characteristics of the fiber tapering.

FIG. 4 schematically shows an apparatus which, albeit experimental, is suitable for implementing the method of the invention. The apparatus comprises a micro-furnace 41 for fusing the fibers. The micro-furnace 41 is preferably made of platinum and has a length of approximately 13 mm. For heating the micro-furnace 41, an induction coil 42 is associated therewith and is supplied by a radio frequency generator 43. A pyrometer 44 is also operatively coupled to the micro-furnace 41, so as to externally measure the temperature thereof.

The apparatus also comprises two drives 461, 462, adapted for translating towards and away from the micro-furnace 41, for stretching the fibers. An optical signal generator 47 is provided to inject an optical signal into one of the two fibers 201, 202, for example fiber 201, from one end thereof. Two power meters 481, 482 are provided to measure the optical power at the outputs of the fibers. Alternatively, a two-channel power meter can be used: in this case, numerals 481 and 482 designate the two channels of the power meter.

The radio-frequency generator 43, the pyrometer 44, the drives 461, 462 and the power meters 481, 482 are operatively connected to and controlled by a control unit 49, for example a personal computer.

In the following, a possible practical implementation of the method according to the invention by using the apparatus of FIG. 4 will be described.

Two fibers 201, 202, for example step-index fibers of the type SMF 28 produced by Corning, are initially subjected to a step of stripping of their plastic (typically acrylate) coating 50 for respective sections thereof, for example of the length of approximately 40 mm each.

The two fibers 201, 202 are then placed inside the micro-furnace 41, and are brought in physical contact to each other, for example submitting them to a twisting of 360°. Then, the fibers are attached to the drives 461, 462.

The following steps provide for fusing together and tapering the fibers in a substantially central region of the fiber sections from which the coating has been removed.

More particularly, one of the two fibers, for example fiber 201, is coupled at one end thereof, chosen to act as an optical input, to the optical signal generator 47; the latter is tuned to generate an optical signal at a nominal wavelength of 1550 nm. The opposite ends of the fibers, chosen to act as optical outputs, are coupled to the power meters 481, 482.

The radio-frequency generator 43 is then activated to heat the micro-furnace 41. The fibers are thus submitted to a process of fusion without stretching: the micro-furnace temperature is brought to approximately 1470° C. and kept to this value for a prescribed period of time, for example 120 seconds, sufficient to soften the fibers, while the drives are kept deactivated. A process of fusion and simultaneous stretching of fibers follows: the micro-furnace temperature is raised, preferably to approximately 1580° C., and the drives 461, 462 are activated to stretch the fibers. To this purpose, the two drives move away from each other at a prescribed speed; preferably, each drive is moved away from the micro-furnace at a speed of approximately 0.33 mm/sec. During this process, the control unit 49 monitors the optical power measured by the power meters 481, 482: as the fibers are fused together and stretched, they become more and more tapered. The tapering causes optical power of the mode propagating through fiber 201 to be transferred by optical coupling to fiber 202. The process is terminated when the monitored degree of coupling between the fibers reaches a prescribed value, preferably comprised between 0 and $3/1000$, for example approximately $1/1000$. The Applicant has experimentally found that, with the cited fibers and experimental conditions, this value of optical power coupling corresponds to approximately 8 mm of stretching.

Figure 5:
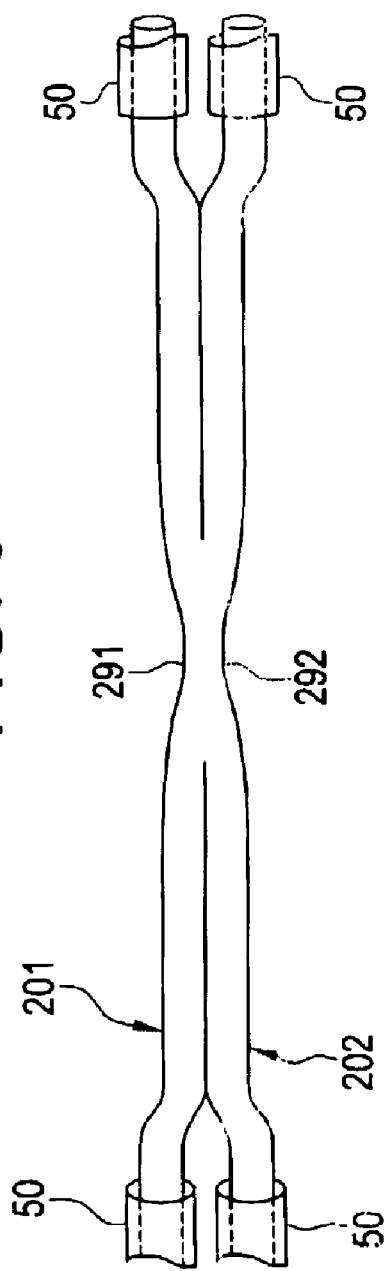
FIG. 5 is a schematic elevation view of a MZI at an intermediate step of fabrication.

In this way, as shown in FIG. 5, the fused and tapered fiber portions 291, 292 depicted in FIG. 2 have been obtained.

The following steps provides for forming one of the two optical couplers 5, 6, for example optical coupler 5.

The two drives 461, 462 are moved jointly in a same sense to bring in the fusion zone a new region of the fiber sections from which the coating 50 has been stripped off. For example, the drives are moved jointly towards the right of FIG. 4, so as to bring in the fusion zone a new fiber region situated at the left of the fused and tapered fiber portions 291, 292. Preferably, the new fiber region is located at approximately 4 mm from the fused and tapered portions 291, 292.

The optical signal generator is tuned to generate an optical signal at a nominal wavelength of 1310 nm.

The radio-frequency generator is activated and the fibers are submitted to a process of fusion without stretching: the micro-furnace temperature is brought to approximately 1490° C. and kept to this value for a prescribed period of time, for example 120 seconds, sufficient to soften the fibers, while the drives are kept deactivated. A process of fusion and simultaneous stretching of the fibers follows: the micro-furnace temperature is raised, preferably to approximately 1600° C., and the drives 461, 462 are activated to stretch the fibers. To this purpose, the two drives move away from each other at a prescribed speed; preferably, each drive is moved away the micro-furnace 41 at a speed of approximately 0.32 mm/sec. During this process, the control unit 49 monitors the optical power measured by the power meters 481, 482. The process is terminated when the degree of coupling between the fibers reaches a prescribed value, for example nominally $50/100$ (in the practice, a value in the range $45/100$ to $55/100$ is suitable). The Applicant has experimentally found that, with the cited experimental conditions, this value of optical power coupling corresponds to approximately 12 mm of stretching.

In this way, the optical coupler 5 has been formed.

The following steps provides for forming the other of the two optical couplers, in the example optical coupler 6. These steps are substantially similar to those just described for the formation of the first optical coupler.

Firstly, the two drives are moved jointly in a same sense to bring in the fusion zone a new region of the fiber sections from which the coating 50 has been stripped off. For example, the drives are moved jointly towards the left of FIG. 4, so as to bring in the fusion zone a new region of the fibers situated at the right of the fused and tapered portions 291, 292. Preferably, the drives are moved so as to displace the fibers of approximately 13.5 mm compared to the previous position.

The optical signal generator again generates an optical signal at a nominal wavelength of 1310 nm.

The radio-frequency generator is then activated and the fibers are submitted to a process of fusion without stretching: the micro-furnace temperature is brought to approximately 1490° C. and kept to this value for a prescribed period of time, for example 120 seconds, sufficient to soften the fibers, while the drives are kept deactivated. A process of fusion and simultaneous stretching of the fibers follows: the micro-furnace temperature is raised, preferably to approximately 1600° C., and the drives 461, 462 are activated to stretch the fibers. To this purpose, the two drives move away from each other at a prescribed speed; preferably, each drive is moved away from the micro-furnace at a speed of approximately 0.32 mm/sec. During this process, the control unit 49 monitors the optical power measured by the power meters 481, 482. The process is terminated when the monitored degree of coupling between the fibers reaches a prescribed value, for example nominally $50/100$ (practically, the value can be in the range $55/100$ to $45/100$, depending on the degree of coupling reached during the formation of the first optical coupler). The Applicant has experimentally found that, with the cited experimental conditions, this value of optical power coupling corresponds to approximately 12.2 mm of stretching.

In this way, the second optical coupler 6 has been formed.

The structure thus obtained is then attached to a support substrate. To this end, a support substrate 60 (FIG. 6), preferably made of quartz, is introduced into the micro-furnace. Thermosetting epoxy resin is added in prescribed attachment locations of the structure. Preferably, such locations are two locations 61, 62 situated substantially at the two boundaries of the fiber sections from which the coating 50 has previously been stripped off. The resin is then cured at 120° C.

It is to be noted that during the phase of forming the two optical couplers the optical signal generator is tuned on a wavelength (1310 nm) corresponding to the operating wavelength of the MZI. Differently, in the phase of fusing together and tapering the fibers in the region of the interferometer arms the optical signal generator is tuned on a wavelength (1550 nm) higher than the MZI operating wavelength. The reason for this resides in the fact that, with the cited experimental conditions, at the operating wavelength, the desired degree of optical power coupling to be reached during this phase should be as low as possible, which would be very hard to be monitored. As known, the degree of optical coupling in a given structure of coupled fibers increases with the wavelength of the propagating mode (A. W. Snyder, J. D. Love, "Optical Waveguide Theory", Chapman and Hall, 1983, Cap. 18). Thus, monitoring the phase of fusing together and tapering the fibers in the region of the interferometer arms with an optical signal at a higher wavelength allows to set a prescribed degree of coupling, to be reached before the process is terminated, that on one hand is not so small to be hardly measured, and at the same assures that at the MZI operating wavelength the coupling between the two fibers in the central region of the MZI is negligible.

The Applicant has experimentally observed that with the above described method a MZI can be obtained having the following features:

operating wavelength: 1310 nm overall loss: 0.2 dB isolation between the outputs: 20 dB thermal stability: variations of output power partition between the outputs less than 0.5% in a temperature range from 25 to 100° C.

The MZI obtained by means of the method according to the invention has a monolithic structure, since the two fibers form a substantially single block. Thanks to this, the MZI is substantially not affected by stresses (temperature, vibrations etc.) causing undesired differential optical path variations of the interferometer arms.

Thanks to the fact that the step of fusing together and tapering the fibers in the region of the interferometer arms is carried out monitoring the coupled optical power, this step can be terminated when the optical coupling between the fibers is still substantially negligible (for example, of the order of $1/1000$ at a longer wavelength). In this way, the interferometric properties of the final device are not altered. However, comparing as in FIGS. 3 and 3A the optical power distribution of the propagating mode on a transversal cross-section of the fibers in the region of the interferometer arms, it can be seen that the optical power distribution of the propagating mode is wide compared to the external dimension of the fibers.

The width of the optical power distribution of the propagating mode allows for increasing the efficiency of the interaction between the propagating mode and an external signal.

In order to form a optical device, for example an optical switch, which comprise said Mach-Zehnder interferometer, one of the two arm of the interferometer may comprise a control element act to obtain a differential phase displacement of 180°.

For example, said control element may cause a thermo-optical effect; the interferometer arms shall be subjected to a differential heating, so as to obtain said differential phase displacement of 180°. As schematically shown in FIG. 3, the control element is a thermo-optical actuator and comprise a resistive material film 33 applied externally to the fiber 201. Said resistive material film is supplied with a electrical control voltage in order to heat said fiber 201.

Said control element heat laterally only one of the two fibers. The heat distribution inside the tapered fiber structure is much more efficient than inside the non-tapered one shown in FIG. 3A, so that a lower control voltage is to be supplied to the resistive material film 33 and a better dynamic response is achieved. Other type of control element for controlling the MZI can however be used, such as for example control elements based on the piezo-electric effect.

Advantageously, the step of fusing together and tapering the fibers in the region of the interferometer arms is carried out before the steps of forming the optical couplers. In this way, when the optical couplers are formed the structure is already substantially monolithic, that is it has already been rendered stable. This makes the fabrication method sufficiently reproducible. It is in fact to be observed that during the step of fusing and tapering the fibers for forming the last optical coupler, a stable monitoring of the optical power is important to be able to stop the process at the desired prescribed point. At this time the structure is in fact already interferometric in nature, and any differential stress, e.g. mechanical, possibly induced during the fiber tapering could make the power monitoring unstable.

Figure 6:
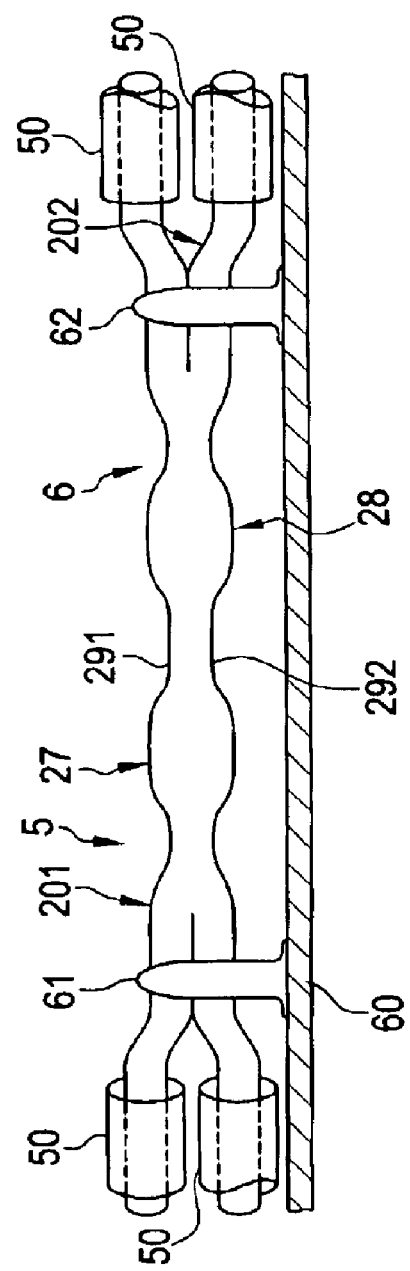
FIG. 6 shows the MZI of FIG. 2 secured to a support.

A further advantage of the MZI according to the invention resides in the simplified attachment thereof to a support substrate. Conventionally, after the fabrication of the MZI is completed the device is attached by gluing to a stiff support substrate, so as to confer mechanical stability and to protect the structure. Thanks to the fact that the MZI according to the invention is substantially monolithic, it is sufficient to provide only two attachment locations to the support, as depicted in FIG. 6.

It is to be noted that the fibers could be fused and tapered in more than one portion along the interferometer arms. For example, this could be useful should the MZI be very long, with arms longer than approximately 9 mm.

What is claimed is:

1. Method of making an all-fiber Mach-Zehnder interferometer comprising at least two optical fibers, characterized by comprising the following steps:

bringing the fibers in a reciprocal contact relationship for a contact section thereof;

fusing together and tapering the fibers in at least a first portion of said contact section while monitoring a degree of optical coupling between the fibers and terminating the tapering when a monitored degree of optical coupling reaches a prescribed value less than about $3/1000$;

forming at least two optical couplers between the fibers in a second and a third portions of said contact section, located at opposite sides of said first portion.

2. Method according to claim 1, in which said first portion is located mid way between the second and third portions and the tapering of said first portion is terminated when said prescribed value is approximately equal to about $1/1000$.

3. Method according to claim 1, in which said monitoring the degree of optical coupling comprises injecting into one of the fibers an optical signal at a monitoring wavelength higher than an operating wavelength of the Mach-Zehnder interferometer, and monitoring a coupled optical power at said wavelength.

4. Method according to claim 3, in which said monitoring wavelength is approximately equal to 1550 nm and said operating wavelength is approximately equal to 1310 nm.

5. Method according to claim 1, in which said fusing together and tapering the fibers precedes said forming at least two optical couplers.

6. Method according to claim 1, in which said fusing together and tapering the fibers comprises stretching the fibers in said first portion of the contact section.

7. Method according to claim 6, in which said fusing and tapering the first and second fibers comprises softening without stretching the fibers in said first portion of the contact section, and then simultaneously fusing together and stretching the fibers.

8. Method according to claim 7, in which said softening the fibers comprises heating the fibers in said first portion of the contact section up to a first prescribed temperature, and said simultaneously fusing together and stretching the fibers comprises heating the fibers in said first portion of the contact section up to a second prescribed temperature, higher than the first prescribed temperature.

9. Method according to claim 8, in which said first prescribed temperature is approximately equal to 1470° C., and said second prescribed temperature is approximately equal to 1580° C.

10. Method according to claim 8, in which said heating to said second prescribed temperature precedes said monitoring optical coupling.

11. Method according to claim 8, in which said monitoring optical coupling is done during heating to said second prescribed temperature.

12. All-fiber Mach-Zehnder interferometer comprising at least two optical fibers in reciprocal contact relationship in a contact section thereof and at least two optical couplers respectively formed in a first and second portions of said contact section, characterized in that the fibers are fused together and tapered, in response to a monitored degree of optical coupling between the fibers, in at least a third portion intermediate the first and second portions of the contact section.

13. Mach-Zehnder interferometer according to claim 12, in which said third portion is located mid way between the second and first portion of the contact section and the tapering of said third portion is terminated when said monitored degree of optical coupling between the fibers is less than about 3/1000.

14. Mach-Zehnder interferometer according to claim 12, in which said third portion substantially extends from the first portion to the second portion of the contact section and the tapering of said third portion is terminated when said monitored degree of optical coupling between the fibers is about 1/1000.

15. Mach-Zehnder interferometer according, to claim 12 in which said fibers are secured to a support in two securing locations substantially at two ends of said contact section for providing thermal stability in power variation of less than about 0.5% in a temperature range from 25 to 100° C.

16. Mach-Zehnder interferometer according to claim 12 further comprising;

a control element associated to said third intermediate portion adapted to vary the phase of an optical signal that is propagating in said Mach-Zehnder interferometer to form an optical device.

17. Optical device according to claim 16, in which said control element is a thermo-optical actuator.

18. Optical device according to claim 17, in which said thermo-optical actuator is a resistive material film applied externally to the fiber.

19. Optical device according to claim 17, in which said control element is a piezoelectric actuator.

20. Mach-Zehnder interferometer according to claim 12, wherein the third portion has a wider optical power distribution of the propagation mode after fiber tapering than before tapering.

* * * * *